United States Patent Office 3,027,392
Patented Mar. 27, 1962

3,027,392
ORGANIC COMPOUNDS OF FOURTH-GROUP METALS
Daniel F. Herman, Orange, N.J., assignor to National Lead Company, New York, N.Y., a corporation of New Jersey
No Drawing. Filed July 16, 1954, Ser. No. 443,956
5 Claims. (Cl. 260—429.5)

This invention relates to novel organometallic compounds. More particularly it relates to organometallic compounds involving a stable metal-carbon bond. Still more specifically, this invention relates to stable metallanes of metals of group IV–b of the periodic table and to methods for preparing the same.

Numerous attempts have been made in the past to produce stable compounds involving direct metal-carbon bonds from group IV–b metals. For example it has been suggested to react lithium alkyls and aryls with alkoxy-titanium chlorides or tetraalkyl orthotitanates and also to react aryl Grignard reagents with tetraalkyl titanates. Similar methods were proposed for the production of compounds involving stable carbon-zirconium and carbon-hafnium bonds.

These previously suggested methods, however, were uniformly unsuccessful in producing stable compounds containing carbon-metal bonds. The difficulty experienced in producing such compounds was somewhat surprising and became the subject of considerable theoretical conjecture. One possible reason for the marked difference is behaviour between metals of this type and other similar metals which do readily form metal-to-carbon bonds, as for example silicon, was pointed out by Krause and von Grosse in their authoritative work "Die Chemie der metallorganischen Verbindungen," p. 737 in which is said concerning the elements which do not form alkyl compounds:

"Of the other 44 elements, no element-alkyls have been produced in spite of 80 years of diligent research. These elements (with the exception of chromium) all lie adjacent one another in the periodic system; all are metals; from scandium to nickel (atomic number 21 to 28); from yttrium to palladium (atomic number 39 to 46), from lanthanum to platinum (atomic number 57 to 78) and from actinium to uranium (atomic number 89 to 92)."

Titanium, is, of course, included in the first of the above-named groups (scandium to nickel), while zirconium belongs to the second, cerium and hafnium third, and thorium to the fourth.

Krause and von Grosse explain this difference in behaviour as being attributable to the fact that all of the valence electrons of silicon, for example, are in the same principal quantum shell, whereas those of the titanium and other members of the several named series are distributed between two successive principal quantum shells. Whether or not this explanation is the true one, has not been definitely established, but the hypothesis appears to fit the observed facts, namely that elements of this type do not readily form compounds involving metal-to-carbon bonds.

It is an object of this invention, therefore, to provide novel organic compounds. A further object is to provide novel organometallic compounds which contain direct metal-to-carbon bonds. A particularly desirable object is to provide directly-bonded compounds which are sufficiently stable to permit of preparation in bulk and reasonable storage prior to use. It is also an object of this invention to provide methods for the manufacture of such compounds. Other objects and advantages of the present invention will become apparent from the following more complete description and claims.

In its broader aspects this invention contemplates a stable metallane of a metal from group IV–b' of the periodic table. In a particularly desirable embodiment this invention contemplates a stable metallane characterized by an atom of a group IV–b metal directly bonded to a 5 membered carbon ring, said compound derived from a five-membered ring having a pair of conjugated double bonds. The group IV–b metals to which this invention is particularly applicable comprise titanium, zirconium and hafnium. These metals are classified as group IV–b metals according to Lange's Handbook of Chemistry, Eighth edition (1952) in the table on pages 56–57.

By "stable" is meant that the compound so described is not inherently unstable, i.e. it will not decompose of itself unless acted upon by some external agency such as the action of air, water, ultra-violet radiation etc. The preferred metallanes of this invention are further characterized in that a five membered carbon ring is directly bonded to the group IV–b metal and is derived from a five-membered carbon ring comprising a pair of conjugated double bonds. Resonance between such bonds appears to stabilize the structure. Such resonance-stabilized organic radicals include cyclopentadienyl radicals and the monovalent radicals derived by removal of a hydrogen atom from such compounds as fluorene and the various fulvenes as well as the indenyl and similar radicals discussed in application Serial No. 339,456, filed February 27, 1953, and now abandoned, of which this is in part a continuation.

The number of metal-carbon bonds that can be introduced into the molecule appears to depend upon the particular organic radical involved: with the phenyl and substituted phenyl radicals described in the above-mentioned copending application, for example, the stability of the compounds produced is such that compounds containing more than one metal-carbon bond appears to be inherently unstable, whereas with certain of the radicals herein disclosed and claimed, the stability of the compounds produced is such that two valences of the metal atom may take part in the formation of metal-carbon bonds (with two different aryl groups) without adversely affecting the stability of the compounds produced.

This invention also contemplates the method of producing organometallic compounds of group IV–b metals which comprises reacting a substance selected from the group consisting of alkyl orthoesters of said metals and halides of said metals with a substance from the group consisting of metal aryls and aryl magnesium Grignard reagents.

The term "aryl" or aromatic as used herein, is to be understood as not limited merely to its narrow meaning, which requires the presence of a benzene ring, but rather should be read broadly to include other resonance-stabilized structures such as cyclopentadiene, indene, and the like.

The aryl groups just described may be employed in the form of alkali-aryls, aryl magnesium Grignard reagents, cadmium or zinc aryls or the like, but the lithium aryls and especially the aryl magnesium Grignards are preferred.

The simpler monomeric compounds according to the present invention may be represented by the formula $R_nMX_m$ where R is a resonance-stabilized organic radical bonded to M through a carbon atom which is a member of a five-membered ring, M is metal from group IV–b in the periodic table, X is selected from the group consisting of alkoxy, cycloalkoxy and aryloxy groups and halogen atoms, $n$ is from one to two and $m$ is from two to three, the sum of $m$ and $n$ being substantially four. The alkoxy and cycloalkoxy groups, if present, may be substituted or unsubstituted and saturated or unsaturated groups containing up to about 16 carbon atoms. It is preferred however, in the case of the alkoxy and cycloalkoxy groups, to employ low molecular-weight groups containing less than 6 carbon atoms because such groups are more reactive and give products in general which are more stable and more readily isolated.

If desired, those metallanes which contain alkoxy, cycloalkoxy or aryloxy groups may be partially hydrolyzed by the addition of small amounts of water to give condensation polymers containing Ti—O—Ti groups in a manner entirely analogous to the production of such condensation polymers from ordinary alkyl, cycloalkyl or aryl titanates. Such condensed metallanes may be characterized by the formula:

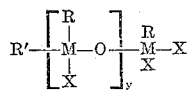

where R is a resonance-stabilized organic radical bonded to M through a carbon atom which is a member of a five-membered ring, M is a metal from group IV–b of the periodic table, R' may be a resonance-stabilized radical as above, alkoxy, cycloalkoxy or aryloxy group or a halogen atom, and y is an integer greater than unity. X may be another R' group or another

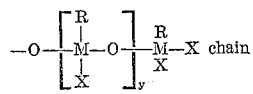 chain

The preferred method of preparation of the compounds according to this invention is simply to add the substitution reagent to a tetraalkyl orthoester of the metal employed, the process being carried out in the absence of moisture and in an inert solvent (such as ether) from slightly below room temperature up to about 50–60° C. The upper temperature of 50–60° C. is imposed merely by the boiling temperature of the customary solvent mixtures. Higher temperatures may of course be employed if desired, by operating under pressure or employing higher-boiling solvents. The resulting product is a solid suspension or a solution of the metallane or complexes thereof.

The organometallic compounds contemplated by this invention have been labelled "metallanes," indicating compounds to some degree analogous in structure to the silanes. Similarly, the word titanane has been coined to cover metallanes in which the metal bonded to carbon is titanium, "zirconane" for the corresponding zirconium compounds, "hafnane" for the corresponding hafnium compounds etc.

In order to further illustrate the nature, preparation and uses of the novel compounds of this invention, the following examples are presented:

Cyclopentadienyl magnesium bromide was prepared from ethyl magnesium bromide and cyclopentadiene employing the customary precautions to exclude moisture from the reactants at all times. For example, to one mol of ethyl magnesium bromide dissolved in a mixed solvent of 300 ml. ethyl ether and 300 ml. of toluol held at 55° to 60° C. was slowly added with stirring 1.2 mol of freshly distilled cyclopentadiene over a period of about 2 hours. The reaction was continued an additional 3 hours at reflux temperature in order to complete it. This solution of cyclopentadienyl Grignard was employed, as is, in Examples I, II and III.

EXAMPLE I

Two hundred fifty ml. of the above ethyl ether-toluene solution containing 0.31 mol cyclopentadienyl magnesium bromide were added with stirring under a substantially anhydrous nitrogen atmosphere to an ethyl ether solution maintained at 15° C. and containing 0.31 mol butyl titanate. The addition was made in ¾ hour. The color of the reactants gradually darkened to an amber during the addition but no sign of the blue-purple color of titanous ion was apparent, thus indicating thermal stability of the cyclopentadienyl-titanium bond. At this point, a crystalline material was found in the reaction product. Analysis indicated that it contained 5.5% and 33.5% of the total titanium and magnesium values respectively used for the reaction. Thus, 94.5% of the titanium and 66.5% of the magnesium are retained in solution.

Preparation of Condensed Cyclopentadienyl Titane

A small sample of the mixed reactants was added to an excess of 10% sulfuric acid in order to demonstrate the conversion of the unisolated cyclopentadienyl titanium derivative into cyclopentadienyl polymer by acid hydrolysis. This brought about precipitation of a bulky yellow solid which was filtered, washed with water and dried at 60° C. The light-mustard colored, partially hydrolyzed polymeric material which resulted analyzed at 19.7% titanium, 29.5% C and 4.03% H, and was substantially insoluble in water but moderately soluble in benzene, acetone and diethyl ether. It was also soluble, on heating, in glycerol, propylene glycol, and mixed $C_{18}$ alcohols, but insoluble in toluene, hot butyl titanate and caprylic acid.

Preparation of Cyclopentadienyl Dibutoxy Titanium Bromide

The main body of the mixed reactants was refluxed for a short period and then 135 ml. of solvent (mostly ethyl ether) was distilled off, the temperature of the mixture rising to 49° C. One hundred ml. of benzene was added to replace the solvent ether which had been removed. In order to isolate a purified product, a portion of this benzene diluted solution, containing 0.21 mol of soluble titanium compound, was treated with .0071 mol of titanium tetrachloride. A slight exothermic reaction occurred and a light-colored precipitate of inorganic magnesium salts settled out. The supernatant liquid was filtered into a distillation apparatus and the volatile solvents were removed at a maximum temperature of 50° C. under reduced pressure. The solvent-free product was vacuum distilled, 33.9 grams of an amber-colored distillate boiling between 150° and 159° C. at 0.8 mm. Hg pressure being obtained. The distillate was refractionated through a short column and about 25 grams of a light yellow product was obtained which distilled between 136° and 145° C. at 0.8 mm. Hg pressure. Analysis of the product indicated it to be cyclopentadienyl dibutoxy titanium bromide. A sample stored for 11 days at room temperature with Michler's ketone showed a negative test for a reactive carbon-to-metal bond.

Condensation of Cyclopentadienyl Dibutoxy Titanium Bromide

On exposure to air, the butoxy groups of the above product readily hydrolyzed to give a yellow-colored solid which was substantially insoluble in water and somewhat soluble in diethyl ether, acetone and benzene giving yellow-colored solutions. The analysis and properties of this air-condensed product were substantially identical with those of the acid-condensed one described above.

EXAMPLE II

Under substantially anhydrous nitrogen atmosphere, a warm ethyl ether-toluene solution containing ¼ mol cyclopentadienyl magnesium bromide was slowly added with stirring to ¼ mol (85 grams) butyl titanate. During this addition, which took place in one hour, the reactants were warmed slightly so that the reaction temperature was in the range 50° to 57° C. A deep red solution resulted which stayed clear on standing overnight. The next day, ¹⁄₁₆ mol (11.9 grams) titanium tetrachloride in 75 ml. of petroleum ether was slowly added in about one hour's time. A slight exothermic reaction raised the temperature from 24° to 36° C. and a small quantity of bright red crystals were formed. The reaction temperature was raised to 45°–50° C. and held 1½ hours with stirring. The red crystals were recovered by decanting the dark red supernatant liquid, rinsing the crystals several times with petroleum ether, and recrystallization from toluene. Analysis showed the product to be substantially biscyclopentadienyl titanium dibromide. The red crystals do not melt up to 290° C. but rapidly become dark above 265° C. The clear decanted liquid was vacuum distilled as in Example I to obtain monocyclopentadienyl dibutoxy titanium bromide as before.

EXAMPLE III

Under a substantially anhydrous nitrogen atmosphere, ¼ mol of cyclopentadienyl magnesium bromide in ethyl ether-toluene solution was added with stirring to ⅛ mol of butyl titanate. The addition was accomplished in about an hour, the temperature ranging from 29° to 44° C. The resulting deep red solution was held between 40° and 44° C. for a half hour and then allowed to cool. To this solution was slowly added 1/16 mol titanium tetrachloride dissolved in 150 ml. petroleum ether. During the addition, the temperature rose from 24° to 33° C. and a considerable quantity of bright red crystals formed. The mixture was warmed to 45–50° C. and held there for about two hours with stirring. The red crystals were recovered and rinsed by decantation several times with petroleum ether. A purified product was prepared by recrystallization from toluol. This material did not melt up to 290° C. but darkened rapidly around 265° C. The product was biscyclopentadienyl titanium dibromide, substantially similar to that obtained in Example II.

EXAMPLE IV

*Reaction of Indenylmagnesium Bromide and Butyl Titanate*

Four tenths of a mole of indenylmagnesium bromide was prepared by the reaction of 46.5 g. of indene with 0.4 mole of methylmagnesium bromide in 300 ml. xylene by refluxing for 14 hours. The Grignard reagent was formed as an insoluble slurry. This was then added within 55 minutes with stirring under a substantially anhydrous nitrogen atmosphere to 0.4 mol of butyl titanate in 300 ml. ether maintained at approximately 15° C. The insoluble Grignard dissolved immediately upon addition to the butyl titanate yielding a single phase solution containing only a trace of insoluble solids, thus indicating a rapid reaction in the formation of the indenyl-titanium bond. Storage of the reaction product at room temperature for a prolonged time gave only a trace of trivalent titanium compounds indicating the product to be thermally stable. In order to isolate the product from undesirable magnesium contaminants, 0.11 mole of titanium tetrachloride dissolved in 150 ml. of purified hexane was added dropwise within 45 minutes and a light-colored precipitate of inorganic magnesium salts settled out. The supernatant liquid was filtered into a distillation apparatus and the volatile solvents were removed under reduced pressure. A residue of substantially pure indenyl dibutoxy titanium monobromide was thus obtained.

EXAMPLE V

*Cyclopentadienyl Zirconium Trichloride*

Two hundred fifty ml. of an ethyl ether-toluene solution containing 0.35 mole cyclopentadienyl-magnesium chloride was added with stirring under a substantially anhydrous nitrogen atmosphere, to an ethyl ether solution containing 0.35 mole zirconium tetrachloride. The addition was made within 1 and ½ hours and the temperature was maintained at 20° C. At the end of the addition, the insoluble magnesium salts were filtered, protecting the filtrate from atmospheric moisture and the ether was evaporated to yield crystalline cyclopentadienyl zirconium trichloride.

EXAMPLE VI

Ten grams cyclopentadienyl dibutoxy titanium bromide was dissolved in a solution of 25.7 grams type N–7.5 ethyl cellulose in 103 grams solvent comprising 80% benzene and 20% butanol by volume. This combination yielded a hard, tack-free film.

EXAMPLE VII

A 5.6 gram sample of cyclopentadienyl dibutoxy titanium bromide was mixed under substantially anhydrous conditions with 5 grams of a 20% solution of ethylene glycol in butyl alcohol. When flowed on a glass panel in a dry atmosphere, this mixture, on evaporation of the butyl alcohol, produced a clear, yellow, moderately tough continuous film.

The organometallic compounds of this invention are among the first successfully prepared stable organic compounds containing direct carbon-metal bonds to metals from group IV–*b* of the periodic table. They are useful as reactive intermediates in the synthesis of more complex organic and organo-metallic compounds, as catalysts for the polymerization or vulcanization of such polymerizable substances as butadiene, styrene, acrylates, methacrylates and the like, as modifiers for film-forming and drying compositions and in various other ways which the unique chemical structure of these compounds will suggest to those skilled in the art.

While this invention has been described and illustrated by the examples shown it is not intended to be limited strictly thereto and other modifications and variations may be employed within the scope of the following claims.

I claim:

1. A resonance-stabilized titanium organic compound characterized in that said titanium is bonded directly to a carbon atom of a five-membered carbon ring, said compound being R titanium dialkoxy monohalide where R is selected from the group consisting of cyclopentadiene and indene, the alkoxy groups being lower alkoxides.

2. Compound according to claim 1 in which the R in the compound is monocyclopentadiene.

3. Compound according to claim 1 in which the R in the compound is monoindene.

4. Compound according to claim 1 in which said compound is monocyclopentadienyl titanium dibutoxy monobromide.

5. Compound according to claim 1 in which said compound is monoindenyl titanium dibutoxy monobromide.

References Cited in the file of this patent

UNITED STATES PATENTS

| | | |
|---|---|---|
| 2,643,262 | Bostwick | June 23, 1953 |
| 2,658,058 | Werkema | Nov. 3, 1953 |
| 2,659,717 | Park | Nov. 17, 1953 |
| 2,709,174 | Rust et al. | May 24, 1955 |

OTHER REFERENCES

Herman et al.: J.A.C.S., vol. 75, pp. 3883–3887.

Winter Paint, Oil Chem. Rev., June 21, 1951, pp. 12, 40 and 41.

Summers et al.: J.A.C.S., vol. 76, pp. 2278–2279, April 20, 1954.

Kraitzer et al.: Jour. Oil Colour Chem. Assoc., vol. 31, pp. 413, 1948.